United States Patent Office 3,732,190
Patented May 8, 1973

3,732,190
SELF-CROSSLINKABLE COPOLYMERS
Gerhard Balle, Cologne-Flittard, and Gunter Kolb, Cologne-Stammheim, Germany, assignors to Bayer Aktiengesellschaft
No Drawing. Continuation-in-part of application Ser. No. 42,891, June 2, 1970. This application Sept. 22, 1971, Ser. No. 182,906
Claims priority, application Germany, July 26, 1969, P 19 38 038.2
Int. Cl. C08f 15/40
U.S. Cl. 260—78.5 R
2 Claims

ABSTRACT OF THE DISCLOSURE

Self-crosslinkable copolymers consisting of copolymerized units of (A) an α-halogenoalkyl ester,
(B) one or more copolymerizable monomers which may be an ester of acrylic acid or methacrylic acid or a conjugated diene,
(C) one or more olefinically unsaturated compounds which are free of carboxyl, hydroxyl, amino and carboxylic acid amide groups and which are different from the monomers of (B) and
(D) one or more olefinically unsaturated compounds containing at least one carboxylic, hydroxyl, amino or carboxylic acid amide group and process of crosslinking the same which comprises elimination of hydrogen halide at a pH of at least 7 and a temperature of 0 to 250° C.

RELATED APPLICATION

This application is a continuation-in-part of application Ser. No. 42,891 filed June 2, 1970 and now abandoned.

This invention relates to a process for the production of crosslinked polymers from the copolymers containing copolymerized units of an α-halogenoalkyl ester of an α,β-unsaturated carboxylic acid.

It is known from German Auslegeschrift No. 1,041,250 that exchange resins can be obtained by polymerizing ethylenically unsaturated carboxylic acid esters containing chlorine in the alcohol radical, especially acrylic or methacrylic acid chloromethyl esters, optionally together with other polymerisable monomeric compounds, and reacting the polymers thus obtained with alkali metal or alkaline earth metal hydrosulphides.

It is also known that spontaneously crosslinkable polymers, containing methylol ether groups for example, can be used in the form of their aqueous dispersions or organic solutions as coating agents and as binders in the textile industry and in the currying of leather. One disadvantage of these spontaneously crosslinkable polymers is that their cross-linking in an alkaline medium, for example when they are used as coating agents on alkaline or acid-sensitive substrates, is not altogether satisfactory at relatively low crosslinking temperatures.

The present invention relates to a process for the production of crosslinked polymers in which copolymers of (A) from 1 to 20% by weight, preferably 2 to 15% by weight of an α-halogenoalkyl ester of the general formula

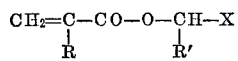

wherein R represents hydrogen or methyl, R' represents hydrogen, methyl or ethyl, and X represents chlorine or bromine,
(B) 99 to 30% by weight, preferably 90-40% by weight, of one or more elastifying monomers, and (C) from 0.5–69% by weight, preferably 5–50% by weight of one or more olefinically saturated compounds which are free from carboxyl groups, hydroxyl groups, amino groups or carboxylic acid amide groups, and which are different from the monomers mentioned in (B), and
(D) from 0.5–69% by weight, preferably 2–20% by weight of one or more olefinically unsaturated compounds containing at least one carboxyl group, hydroxyl group, amino group or carboxylic acid amide group, the sum of components A–D amounting to 100% by weight, are crosslinked under elimination of hydrogen halide at a pH value of at least 7 and a temperature of 0° to 250° C., optionally in the presence of a base which promotes the elimination of the hydrogen halide.

Alternatively the process comprises reaction of copolymers made of components A through C as defined hereabove with di- or polyfunctional carboxylic acids under the described conditions.

The α-halogenoalkyl esters of α,β-unsaturated carboxylic acids mentioned under (A) can be obtained by reacting α,β-unsaturated carboxylic acid halides with aliphatic aldehydes such as formaldehyde, acetaldehyde or propionaldehyde (cf. Journal of General Chemistry, USSR, English Translation, vol. 28 (1958), part III, page 1971).

It is preferred to use the chloromethyl or α-chloroethyl esters of acrylic acid or methacrylic acid, which can be obtained by reacting acrylic or methacrylic acid chloride with formaldehyde or acetaldehyde. Chloromethyl esters of α,β-unsaturated carboxylic acids can also be prepared in accordance with our copending U.S. patent application 5,890, filed Jan. 26, 1970 and now U.S. Pat. 3,641,119 of Feb. 8, 1972.

Elasticising monomers of group (B) primarily include alkyl esters of acrylic acid with from 1 to 20 carbon atoms in the alkyl radical, for example methyl acrylate, ethyl acrylate, isopropyl acrylate, butyl acrylate, 2-ethylhexyl acrylate or stearyl acrylate; alkyl esters of methacrylic acid containing from 4 to 20 carbon atoms in the alkyl radical, for example dodecyl methacrylate; and also conjugated dienes with from 4 to 6 carbon atoms, for example butadiene, isoprene, 2,3-dimethyl-butadiene, or chloroprene, preferably ethyl acrylate, butyl acrylate, 2-ethylhexyl acrylate, dodecyl methacrylate, butadiene, isoprene or chloroprene.

The following comonomers may be used as group (C) comonomers in the polymerization reaction:

(1) Methacrylic acid esters of aliphatic alcohols containing from 1 to 3 carbon atoms, for example methyl methacrylate, or ethyl methacrylate, preferably methyl methacrylate;

(2) Nitriles of α,β-unsaturated carboxylic acids, said nitriles containing from 3 to 5 carbon atoms, for example acrylonitrile or methacrylonitrile, which are preferred.

(3) Aliphatic vinyl compounds, such as vinyl ethers, for example vinyl ethyl ether; vinyl esters of organic carboxylic acids having 2 to 18 carbon atoms in the carboxylic acid moiety, for example vinyl acetate, vinyl propionate or vinyl chloracetate; and vinyl halides, for example vinyl chloride; or aromatic vinyl compounds, for example styrene, vinyl toluene or α-methylstyrene; or vinyl ketones such as vinyl ethyl ketone, preferred are: vinyl acetate, vinyl propionate or vinyl chloroacetate, vinyl chloride, styrene, α-methylstyrene;

(4) Vinylidene compounds, for example vinylidene chloride, preferably vinylidene chloride;

(5) α-Monoolefins with from 2 to 10 carbon atoms, for example ethylene, propylene or isobutene, preferably ethylene or propylene;

(6) Divinyl compounds in quantities of from 0.1% by weight to at most 10% by weight, based on the total monomer content, for example divinyl benzene or ethylene glycol dimethacrylate.

The following are examples of the monomers of group (D):

(7) α,β-Unsaturated carboxylic acids with from 3 to 5 carbon atoms, for example acrylic acid, methacrylic acid, crotonic acid, maleic acid or itaconic acid, preferably acrylic acid, methacrylic acid or maleic acid (8) Hydroxyalkyl esters of unsaturated carboxylic acids with from 3 to 5 carbon atoms and dihydric alcohols containing 2–4 carbon atoms, for example 2-hydroxyethyl (meth)acrylate, 2-hydroxypropyl (meth)acrylate or ω-hydroxybutyl (meth)acrylate, preferably 2-hydroxyethyl (meth)acrylate, 2-hydroxypropyl (meth)acrylate ω-hydroxybutyl (meth)acrylate;

(9) Olefinically unsaturated alcohols containing from 3 to 18 carbon atoms, for example allyl alcohol or hydroxymethylnorbornene;

(10) Aminoalkyl esters or aminoalkyl amides (with 2 to 6 carbon atoms in the alkyl radical) of unsaturated carboxylic acids containing from 3 to 5 carbon atoms, and their salts, for example 2-aminoethyl (meth)acrylate hydrochloride, 2-dimethylaminoethyl (meth)acrylate, 2-aminoethyl (meth)acrylamide, or 2-dimethylaminoethyl (meth)acrylamide, preferably 2-aminoethyl (meth)acrylate hydrochloride, 2-dimethylaminoethyl (meth)acrylate, 2-aminoethyl (meth)acrylamide.

(11) Amides of α,β-unsaturated carboxylic acids with from 3 to 5 carbon atoms, for example acrylamide or methacrylamide, and their N-methylol derivatives, for example N-methylol methacrylamide, preferably acrylamide, methacrylamide.

The copolymers are prepared by conventional polymerization techniques, preferably by subjecting the monomers to radical polymerization in bulk, in solution, in suspension or in emulsion, optionally by the so-called graft copolymerization process. Suitable radical polymerization initiators include inorganic peroxidic compounds such as potassium or ammonium persulphate, hydrogen peroxide or percarbonates, or organic peroxidic compounds, for example acyl peroxides, such as benzoyl or lauroyl peroxide, alkyl peroxides, such as di-tert-butyl peroxide, and alkyl hydroperoxides, such as tert-butyl hydroperoxide, cumene hydroperoxide or p-menthane hydroperoxide. It is of advtntage to use the inorganic and organic peroxidic compounds in conjunction with reducing agents, in accordance with the principle of Redox polymerization. Particularly suitable reducing agents include, for example, alkali metal bisulphites or ammonium bisulphite, sodium formaldehyde sulphoxylate, triethanolamine and tetraethylene pentamine. These catalysts may be used in quantities of from 0.05 to 10% by weight, based on monomers used.

The polymerization temperature is governed by the catalyst system used, and is preferably in the range from 0 to 80° C.

The usual regulators, such as long-chain alkyl mercaptans, diisopropyl xanthogene disulphide or nitro compounds, may be used in the polymerization reaction to influence molecular weight.

Preferred embodiments include polymerization in aqueous emulsion or in organic solution. Either the total quantity of monomers can be polymerized in one batch or, alternatively, a part only of the monomer mixture can be initially introduced, the remainder being added after polymerization has commenced.

Emulsion polymerization usually involves the use of surface-active substances as emulsifiers. Suitable emulsifiers include both anion-active and cation-active as well as non-ionic emulsifiers and combinations of ionic emulsifiers with non-ionic emulsifiers. They are employed in quantities of from 1 to 20% by weight, based on the total monomer mixture.

Solution polymerization is carried out in inert organic solvents such as aliphatic, cycloaliphatic, aromatic or araliphatic hydrocarbons, or esters, ethers, N,N-disubstituted amides or sulphoxides. The solvent should not contain any reactive groups which can react with the α-halogenoalkyl ester moiety.

The copolymers synthesized from components (A) to (D) contain carboxyl, hydroxyl, amino or carboxylic acid amide groups which react by condensation with the halogen of the α-halogenoalkyl ester groups, under the conditions specified below, accompanied by the elimination of the hydrogen halide. This reaction results in the formation of an insoluble crosslinked polymer.

In some instances, it is of advantage to condense copolymers synthesized from components (A) through (C) with low molecular weight compounds which contain at least two groups with Zerewitinoff-active hydrogen atoms which are capable of reacting with the α-halogenoalkyl moieties of the polymer. Of these compounds we prefer to use di- or polyfunctional aliphatic, alicyclic aromatic or heterocyclic carboxylic acids. We have surprisingly found, that the α-halogenalkylester moiety undergoes this condensation reaction readily under the conditions more fully described hereinafter, which is not the case with other halogenalkyl ester moieties that contain halogen in a position β, γ or other with respect to the oxygen atom.

The following are examples of such low molecular weight polycarboxylic acids:

Aliphatic polycarboxylic acids containing from 2 to 18 carbon atoms, for example oxalic acid, adipic acid, azelaic acid or citric acid, aromatic and hydroaromatic polycarboxylic acids, for example phthalic acid, isophthalic acid, terephthalic acid, 5-nitrobenzene-1.3-dicarboxylic acid, tetrachlorophthalic acid, trimellitic acid, pyromellitic acid, tetrahydrophthalic acid, hexahydrophthalic acid, 3.6-endomethylene-$\Delta^4$-tetrahydrophthalic acid ("endic acid"), 3.4.5.6.7.7 .- hexachloro - 3.6 - endomethylene-$\Delta^4$-tetrahydrophthalic acid ("chlorendic acid"), or 2.3 or 2.5-pyridine dicarboxylic acid. Also contemplated is the use of low molecular weight polyesters with terminal carboxyl groups and molecular weights of up to 2000.

Preferred are oxalic acid, adipic acid, azelaic acid, phthalic acid, 5-nitrobenzene-1.3-dicarboxylic acid, tetrachlorophthalic acid, 3.4.5.6.7.7-hexachloro-3.6-endomethylene-$\Delta^4$-tetrahydrophthalic acid.

The reaction of α-halogenoalkyl ester groups with carboxyl, hydroxyl and carboxylic acid amide groups takes place at pH values of at least 7 in the presence of basic compounds which promote the elimination of hydrogen halide from the reactants. The particular type of base used is governed by the medium in which the reaction is carried out. If the polymer is used in the form of aqueous emulsion, it is best to use a water-soluble inorganic base, for example sodium hydroxide or potassium hydroxide. When polymerisation is carried out in organic solution, it is preferred to use bases which are soluble in organic solvents, for example alcoholic potassium hydroxide, hexahydrodimethyl aniline, morpholine, diaza-bicyclooctane or ethylene diamine.

The quantity in which the bases are used is governed by the concentration of the α-halogenoalkyl ester groups to be reacted in the copolymer and is usually from 0.05 to 1.5 mol, and preferably from 0.5 to 1 mol per mol of α-halogenoalkyl ester.

In principle, the reaction proceeds smoothly at temperatures within a wide range whose upper limit is imposed solely by the thermal stability of the reactants used. It is preferred to operate at temperatures of from 0° C. to 250° C. and preferably at temperatures from room temperature (approximately 20° C.) to 150° C.

The preferred embodiment of the invention is the crosslinking of copolymers in which both α-halogenoalkyl ester groups and carboxyl, hydroxyl, amino or carboxylic acid amide groups have been incorporated. The carboxyl group is the preferred crosslinking component. If the aforementioned quantities of a base are added to aqueous emulsions or organic solutions of copolymers of this kind, and the resulting product is cast into films or coatings, these films or coatings crosslink when dried at room temperature or under the influence of heat to form waterproof products which are insoluble in organic solvents.

Polymers of this kind can be used as coating agents for a variety of substrates, for example masonry, Eternite or asbestos cement, or as primers for coating metals. In the case of alkaline substrates, there is little or no need to add a base, because in this case the substrate takes over the role of the base.

In addition, the spontaneously crosslinking copolymers can be used, for example, as binders for pigments in lacquers and for non-woven textiles, and also for finishing textile materials, for currying leather, for treating synthetic and natural fibres and as additives in the production of paper.

In addition, crosslinkable elastomers based on dienes, for example butadiene or isoprene, or on acrylic acid esters, optionally together with acrylonitrile, can be synthesized into the elastomer and α-halogenoalkyl ester of an α,β-unsaturated carboxylic acid in combination with one of the compounds identified as components (D), preferably with an α,β-unsaturated carboxylic acid as, for instance, acrylic acid or methacrylic acid. These elastomers can be cured by addition, under the usual vulcanization conditions, of a basic compound, for example a metal soap of a long chain fatty acid or a mono- or polyfunctional amine. Amines may also be used in the form of derivatives from which the free amines are only released after processing under the vulcanization conditions.

Of course, the polymers of the invention may also be modified by reaction with monofunctional Zerewitinoff-active compounds, and this procedure also leads to very valuable products. Thus, the action of tertiary aliphatic or aromatic amines gives quaternary ammonium salts which may be used as antistatic agents and as hardeners for gelatin. The action of long-chain aliphatic carboxylic acids, alcohols or amines leads to particularly hydrophobic treatment of textile materials.

Example 1

The following monomer mixtures were polymerized in aqueous emulsion:

|  | Parts by weight | | | |
|---|---|---|---|---|
|  | A | B | C | D |
| Ethyl acrylate | 127 | 124 | 121.5 | 119 |
| Butyl acrylate | 127 | 124 | 121.5 | 119 |
| Acrylonitrile | 28 | 27.5 | 27 | 26.5 |
| Chloromethyl methacrylate | 6 | 12 | 18 | 24 |
| Acrylic acid | 12 | 12 | 12 | +12 |

For this purpose, 400 parts by weight of water containing 15 parts by weight of the sodium salt of a long-chain alkylsulphonic acid with approximately 14 to 16 carbon atoms in solution were initially introduced into the polymerization vessel. Approximately 20% of each of the above monomer mixtures were added, while stirring, to the solutions which had been heated to 40° C. After the air present in the apparatus had been displaced with nitrogen, polymerization was initiated by adding the following solutions:

(i) 0.9 part by weight of sodium metabisulphite in 10 parts by weight of water, and
(ii) 3.0 parts by weight of potassium persulphate in 40 parts by weight of water.

After the beginning of polymerization, the temperature in the polymerization vessel rose by some 20° C. The remaining 80% of the monomers were added dropwise over a period of 3 hours, and the polymerization reactions were terminated after 15 hours. The resulting emulsions had solids contents of 40% by weight. Samples of the emulsions were adjusted to a pH value of 9 by the addition of normal caustic soda solution and cast into films. These films were dried for 24 hours at room temperature (20° C.), and then heated for 15 minutes at 50° C., 100° C. and 150° C. The films thus pretreated were covered for 24 hours with dimethyl formamide (DMF) and then weighed after wringing. Comparison with the dry weight of the films gave the percentage swelling in accordance with the following equation:

$$\text{Percent swelling} = \frac{(\text{swollen weight} - \text{dry weight}) \cdot 100}{\text{dry weight}}$$

The results of the tests were:

|  | Percentage swelling | | | |
|---|---|---|---|---|
|  | A | B | C | D |
| Drying temperature: | | | | |
| 20° C | 440 | 335 | 290 | 285 |
| 50° C | 435 | 310 | 285 | 285 |
| 100° C | 385 | 310 | 260 | 250 |
| 150° C | 325 | 250 | 225 | 250 |

It can be seen that, even when drying was carried out at room temperature, swelling was relatively low and that the degree of crosslinking was slightly improved by heating the films. Adequate crosslinking was obtained when the chloromethyl methacrylate content of the copolymer was as small as 2% by weight.

Example 2

A mixture of 75 parts by weight of butyl acrylate, 16 parts by weight of methyl methacrylate, 4 parts by weight of methacrylic acid, and 5 parts by weight of chloromethyl methacrylate was polymerized in aqueous emulsion as in Example 1. The resulting dispersion had a solids content of 40% by weight. Films were cast from the dispersion, adjusted to pH 9 with diluted sodium hydroxide. After drying at room temperature (20° C.) and heating at 50° C., 100° C. and 150° C., these films showed the following percentage swelling:

Drying temperature (° C.): Percent swelling
20 ........................................ 105
50 ........................................ 115
100 ....................................... 90
150 ....................................... 45

For comparison, the dispersions were adjusted to pH 2 and cast into films. The similarly treated films were readily soluble in dimethyl formamide.

Example 3

Aqueous emulsions of copolymers of the following composition were prepared as described in Example 1:

|  | Percent by weight | |
|---|---|---|
|  | A | B |
| Ethyl acrylate | 41 | 39 |
| Butyl acrylate | 41 | 39 |
| Acrylonitrile | 9 | 9 |
| Acrylic acid | 4 | 8 |
| Chloromethyl methacrylate | 5 | 5 |

Both the emulsions had a solids content of 40% by weight. When used as adhesives for laminating textiles, they were adjusted to pH 9 with aqueous ammonia. After coating with the adhesives, the textiles were kept in a press for 3 minutes at 150° C. Both dispersions gave outstanding bond strengths. The bonds proved to be resistant both to water and to solvents. Webbing finished with these dispersions had a pleasantly soft feel.

Example 4

12 parts by weight of chloromethyl methacrylate, 200 parts by weight of ethyl acrylate and 5 parts by weight of acrylic acid were emulsified in 800 parts by weight of water under nitrogen in a vessel equipped with stirring mechanism, with the aid of 4 parts by weight of the sodium salt of a long-chain alkylsulphonic acid containing approximately 14 to 16 carbon atoms. The resulting emulsion was heated to 60° C. A solution of 0.3 part by weight of potassium peroxydisulphate in 50 parts by weight of water, and another solution of 0.03 part by weight of sodium metabisulphite in 50 parts by weight of water, were separately added dropwise to the emulsion over a period of 2 hours while stirring. The product was then stirred for 5 hours at 60° C. and the resulting rubber was precipitated with saturated sodium chloride solution. The rubber crumbs were washed, dried at 50° C. and rolled into a sheet. 100 parts by weight of the polymer were mixed on the roller with 1 part by weight of stearic acid, 40 parts by weight of carbon black and 3 parts by weight of soft soap. The mixture was vulcanised in a press at 180° C., after which the vulcanisate was tempered for 24 hours in air heated to 150° C. The mechanical properties are set out in the following table.

TABLE

| | Vulcanization time, minutes | After vulcanisation |
|---|---|---|
| Tensile strength (kp./cm.²) according to DIN 53504 | 10 | 71 |
| Do | 30 | 72 |
| Breaking elongation (percent) according to DIN 53455 | 10 | 220 |
| Do | 30 | 200 |
| Strain at 100% elongation (kp./cm.²) according to DIN 53504 | 10 | 19 |
| Do | 30 | 23 |
| Hardness (Shore A) at: | | |
| 20° C | 10 | 50 |
| Do | 30 | 51 |
| 75° C | 10 | 45 |
| Do | 30 | 49 |
| Resilience (percent) according to DIN 53512 at: | | |
| 20° C | 10 | 5 |
| Do | 30 | 5 |
| 75° C | 10 | 39 |
| Do | 30 | 42 |

Example 5

The following monomers were polymerized for 20 hours at 120° C. in 100 parts by weight of xylene as solvent and in the presence of 0.5 part by weight of tert-butyl peroxide as catalyst to form 50% by weight solutions:

| | Parts by weight | | | | | |
|---|---|---|---|---|---|---|
| | A | B | C | D | E | F |
| Butyl acrylate | 47.15 | 40 | 45.6 | 40 | 52.15 | 44.3 |
| Styrene | 40 | 34.3 | 40 | 31.2 | 40 | 40 |
| Methacrylic acid | 5 | 10 | | | | |
| Acrylic acid | | | 5 | 10 | | |
| Chloromethyl methacrylate | 7.85 | 15.7 | 9.4 | 18.8 | 7.85 | 15.7 |

Molar quantities (based on chloromethyl methacrylate) of methanolic potassium hydroxide were added to these polymer solutions as in Example 1, and the resulting products were cast into films which were dried for 24 hours at room temperature and then additionally heated for 15 minutes at 100° C. or 150° C., followed by swelling in dimethyl formamide. The following percentage swellings were obtained:

| Drying temperature | A | B | C | D | E | F |
|---|---|---|---|---|---|---|
| 24 hours/22° C | 280 | 220 | 190 | 190 | Dissolved | Dissolved. |
| 15 mins./100° C | 240 | 190 | 160 | 140 | Heavily swollen. | Heavily swollen. |
| 15 mins./150° C | 180 | 140 | 130 | 100 | 320 | 270. |

Various amines were then added to the polymer solutions E and F, the amines being used in molar quantities per mol of chloromethyl methacrylate. The products were further treated as described above and the following percentage swellings were obtained:

| | 15 mins./100° C. | 15 mins. 150° C. |
|---|---|---|
| Solution E hexahydrodimethyl aniline | (¹) | 480 |
| Solution E morpholine | (¹) | 450 |
| Solution E ethylene diamine | 1,070 | 380 |
| Solution F hexahydrodimethyl aniline | (¹) | 380 |
| Solution F morpholine | (¹) | 420 |
| Solution F ethylene diamine | 920 | 250 |

¹ Heavy swelling.

EXAMPLE 6

The following monomer mixtures were polymerized in aqueous emulsion with the catalyst system potassium persulphate/sodium metabisulphite under the conditions of Example 1:

| | Parts by weight | |
|---|---|---|
| | A | B |
| Ethyl acrylate | 198 | 180 |
| Butyl acrylate | 198 | 180 |
| Acrylonitrile | 44 | 40 |
| Chloromethyl methacrylate | 30 | 50 |
| 2-hydroxypropyl methacrylate | 30 | 50 |

The emulsion had a solids content of 40% by weight. After being adjusted to pH 9 with normal potassium hydroxide solution, it was cast into films which, after drying, were heated for 15 minutes at 100° C. and at 150° C.

Swelling of the films with dimethyl formamide gave the following results:

| | Percent swelling | |
|---|---|---|
| | A | B |
| Drying temperature: | | |
| 100° C | 600 | 565 |
| 150° C | 590 | 550 |

The following percentage swellings were measured at pH 7:

| | A | B |
|---|---|---|
| Drying temperatures: | | |
| 100° C | Heavy swelling | 635 |
| 150° C | do | 625 |

EXAMPLE 7

The following emulsion copolymers were prepared by the method described in Example 1 (composition in 1% by weight):

| | A | B |
|---|---|---|
| Ethyl acrylate, parts by weight | 43.2 | 42.3 |
| Butyl acrylate, parts by weight | 43.2 | 42.3 |
| Acrylonitrile, parts by weight | 9.6 | 9.4 |
| 1-chloromethyl methacrylate, parts by weight | 2.0 | 4.0 |
| Methacrylamide, parts by weight | 2.0 | 2.0 |
| Solids content, percent by weight | 37.5 | 33.0 |

After drying and heating (15 minutes at 100° C. and 150° C.), films of the emulsions adjusted to pH 9 with normal potassium hydroxide solution showed the following percentage swellings:

| | Percent swelling | |
|---|---|---|
| | A | B |
| Temperature: | | |
| 100° C | 880 | 540 |
| 150° C | 800 | 530 |

EXAMPLE 8

A mixture of 40.5 parts by weight of ethyl acrylate, 40.5 parts by weight of butyl acrylate, 9.0 parts by weight of acrylonitrile, and 10.0 parts by weight of chloromethyl methacrylate were polymerized to form an aqueous emulsion with a solids content of 40% by weight. Films cast from the emulsion (after it had been adjusted to an alkaline pH) were insoluble when swollen with dimethyl formamide, but even after heating at 150° C. were so heavily swollen that it was no longer possible to determine the percentage of swelling. Samples of the emulsion adjusted to pH 9 were mixed with 4% by weight and 6% by weight, respectively, of oxalic acid, based on the solids content, cast into films, dried and heated at 150° C. Swelling with dimethyl formamide gave the following results:

| Percent weight of oxalic acid: | Percent swelling |
|---|---|
| 4.0 | 490 |
| 6.0 | 590 |

EXAMPLE 9

80 g. of the sodium salt of a long-chain alkylsulphonic acid and 3 g. of tert-dodecyl mercaptan were dissolved in 2000 ml. of water in a 6 litre capacity pressure vessel equipped with stirring mechanism. The air in the apparatus was displaced with nitrogen and the solution was heated to 40° C. 400 g. of a mixture of 1460 g. of butadiene, 80 g. of chloromethyl methacrylate and 60 g. of methacrylic acid were then pumped in and polymerization was initiated by the addition of 5 g. of sodium metabisulphite dissolved in 100 ml. of water and 10 g. of potassium persulphate dissolved in 300 ml. of water. Another 1200 g. of the monomer mixture were pumped in over a period of 3 hours. After a solids content of 40% by weight had been reached, polymerization was stopped, and the latex was run off, freed from residual monomers by thorough stirring, and mixed with 15 g. of 2,2'-methylene-bis-(4-methyl-6-cyclohexylphenol) as anti-oxidant. Samples of the emulsions were adjusted to pH 9 with normal potassium hydroxide solution and cast into films. These films were dried and heated at 100° C. and at 150° C. The swellability of the films was then measured in dimethyl formamide (DMF), trichloroethylene and toluene.

|  | Drying temperatures | |
|---|---|---|
|  | 100° C. | 150° C. |
| Percent swelling in— | | |
| DMF | 14 | 33 |
| Trichlorethylene | 12 | 0 |
| Toluene | 112 | 100 |

EXAMPLE 10

The following copolymers were prepared in the form of 48% by weight solutions in methyl ethyl ketone as solvent (quantities in percent by weight):

|  | A | B |
|---|---|---|
| Butyl acrylate | 40 | 40 |
| Styrene | 52.15 | 44.3 |
| Chloromethyl methacrylate | 7.85 | 15.7 |

The solution were mixed with a quantity of tetrachlorophthalic acid equivalent to the chloromethyl methacrylate component and cast into films. After heating at 130° C. for a period of 1 hour, these films show the following percentage swellings in dimethyl formamide:

| | Percent swelling |
|---|---|
| A | 200 |
| B | 230 |

If the tetrachlorophthalic acid in this example is replaced by an equivalent amount of a monofunctional carboxylic acid, for instance acetic or benzoic acid, the resulting dried films are soluble in dimethylformamide and not useful as protective coatings.

Example 11

20% by weight of a mixture of 69 parts by weight of ethyl acrylate, 30 parts by weight of styrene and 0.5 part by weight of chloromethyl methacrylate were emulsified in a solution of 6 parts by weight of polyethoxylated p-nonylphenol with a degree of polymerization of approximately 30 in 120 parts by weight of water. Polymerization was initiated by the addition of 0.05 part by weight of sodium pyrosulphite and 0.1 part by weight of potassium persulphate. A solution of 0.5 part by weight of β-aminoethyl methacrylate hydrochloride in 30 ml. of water and the remaining 80% by weight of the monomer mixtures were then added dropwise. On completion of the addition, the products were stirred at 40° C. for another 3 hours, after which the solids content amounted to 40% by weight. Samples of the emulsion were adjusted to pH 7 and cast into films which, after drying in air, were heated for 15 minutes at 100° C. and 150° C. Swelling in dimethyl formamide gave the following results:

| | Percent swelling in DMF, pH 7 |
|---|---|
| 100° C. | 720 |
| 150° C. | 575 |

We claim:

1. A self-crosslinkable copolymer consisting of copolymerized units of
   (A) from 2 to 15% by weight of an α-halogenoalkyl ester of the formula

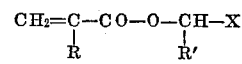

wherein R is hydrogen or methyl, R' is hydrogen, methyl or ethyl and X is chlorine or bromine,
   (B) 40-90% by weight of one or more copolymerizable monomers selected from the group consisting of alkyl esters of acrylic acid having 1 to 20 carbon atoms in the alkyl moiety, alkyl esters of methacrylic acid having 4 to 20 carbon atoms in the alkyl moiety and conjugated dienes having 4 to 6 carbon atoms,
   (C) from 5 to 50% by weight of one or more olefinically unsaturated compounds which are free of carboxyl, hydroxyl, amino and carboxylic acid amide groups and which are different from the monomers specified under (B) and
   (D) from 2 to 20% by weight of one or more olefinically unsaturated compounds containing at least one carboxyl, hydroxyl, amino or carboxylic acid amide group.

2. The self-crosslinkable copolymer of claim 1 wherein (B) is selected from the group consisting of methyl acrylate, ethyl acrylate, butyl acrylate, 2-ethylhexyl acrylate, butyl methacrylate, dodecyl methacrylate, butadiene, isoprene and chloroprene, (C) is selected from the group consisting of methyl methacrylate, ethyl methacrylate, acrylonitrile, methacrylonitrile, vinyl acetate, vinyl propionate, vinyl chloroacetate, vinyl chloride, vinylidene chloride, styrene, α-methylethylene, propylene and isobutylene and (D) is selected from the group consisting of acrylic acid, methacrylic acid, maleic acid, 2-hydroxyethyl acrylate, 2-hydroxyethyl methacrylate, 2-hydroxypropyl methacrylate, ω-hydroxybutyl acrylate, 2-aminoethylacrylate hydrochloride, 2-aminoethylmethacrylate hydrochloride, 2-dimethylaminoethylacrylate, 2-dimethylaminomethacrylate, 2-aminoethyl acrylic acid amide and 2-aminoethyl methacrylic acid amide.

References Cited

UNITED STATES PATENTS

| | | | |
|---|---|---|---|
| 2,161,039 | 6/1939 | Habgood et al. | 260—8.4 |
| 2,492,170 | 12/1949 | Mast et al. | 260—86.1 |
| 3,078,260 | 2/1963 | Hayes | 260—83.5 |
| 3,450,681 | 6/1969 | Gobran et al. | 260—80.72 |
| 3,493,548 | 2/1970 | Chalmers | 260—79.7 |
| 3,510,442 | 5/1970 | Chalmers | 260—23 |

FOREIGN PATENTS

| | | | |
|---|---|---|---|
| 1,041,250 | 1/1963 | Germany | 260—86.1 |

JOSEPH L. SCHOFER, Primary Examiner

S. M. LEVIN, Assistant Examiner

U.S. Cl. X.R.

260—22 R, 23 XA, 32.6 R, 78.5 T, 80.7, 80.73 80.75, 80.76, 80.8, 80.81; 117—123 D, 126 AR, 132 B, 139.5 A, 142